Patented Nov. 25, 1952

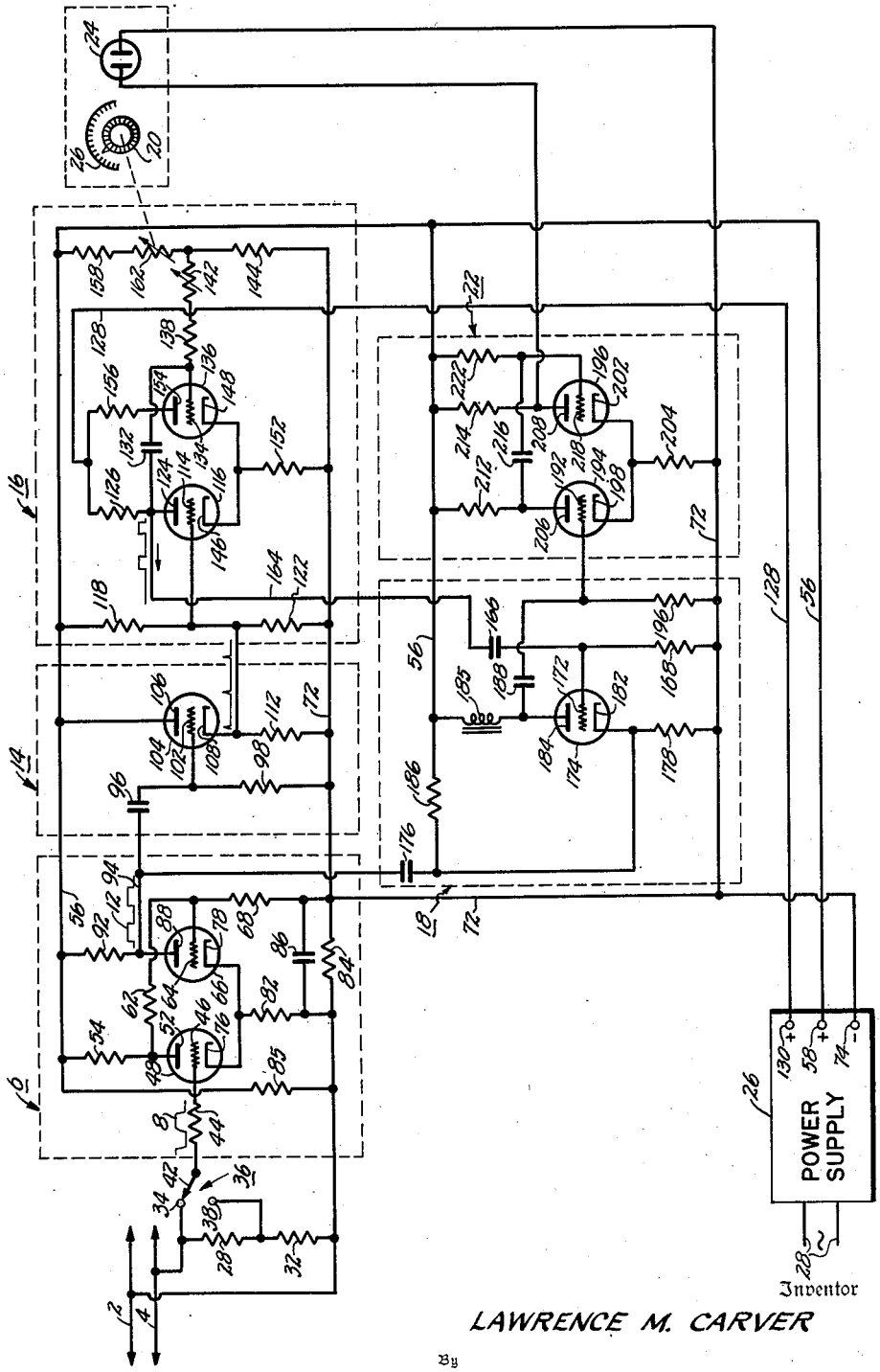

2,619,542

UNITED STATES PATENT OFFICE 2,619,542

TELETYPE MEASURING SYSTEM

Lawrence M. Carver, Stamford, Conn., assignor to C. G. S. Laboratories, Inc., Stamford, Conn., a corporation of Connecticut Application December 13, 1950, Serial No. 200,553

7 Claims. (Cl. 178—69)

This invention relates to the measurement of electrical pulses and particularly to the measurement of bias distortion in teletype signals.

In the automatic transmission of messages, such as in teletype systems, the individual characters are each represented by a unique code-group of pulses. In order for the system to operate properly, the individual pulses at the receiver must have the correct time duration. However, faulty transmission networks or defective components, such as relays and the like, may change the durations of the individual pulses. If such distortion is present to sufficient degree, the receiving apparatus will not reproduce an exact duplicate of the message that was transmitted.

Various types of apparatus have been proposed for measuring this pulse distortion, but the equipment in general has been relatively complex and expensive. Moreover, such delicate equipment, which is also bulky and heavy, is not well adapted for use in portable or field measuring instruments.

Other apparatus, suggested for use in making field measurements, requires that a special test signal be transmitted over the teletype lines while the distortion test is being made, thus interrupting the teletype service over these lines.

In accordance with the present invention, a relatively simple and inexpensive teletype distortion measuring unit is provided which does not require the transmission of any special pulse signals during the test. The invention readily can be incorporated into a light and compact unit entirely suitable for making field measurements, these measurements being made while the lines are in normal use so that there is no interruption of the teletype service.

The various objects, advantages, and aspects of the present invention will be in part apparent from, and in part pointed out in, the following description of a preferred embodiment of the invention considered in conjunction with the accompanying drawing, which shows a diagrammatic representation of the electrical circuits of a bias-distortion measuring instrument embodying the invention.

The apparatus shown in the drawing is adapted to be connected directly to the incoming teletype lines 2 and 4. The received teletype pulses are applied to a squaring device, generally indicated at 6, which re-shapes the incoming waves, as indicated at 8, to form substantially square waves, as indicated at 12.

These square waves are applied to a differentiating stage, generally indicated at 14, which differentiates the square waves and rejects the negative pulses produced therefrom, the resulting sharp positive pulses, corresponding in time to the leading edges of the square waves, being used to trigger a "one-shot" multivibrator circuit, generally indicated at 16.

The pulses or square-waves generated by the multivibrator 16 are differentiated and applied to a coincidence detector, generally indicated at 18, which responds to the narrow positive pulses coinciding in time with the trailing edges of the multivibrator pulses, but does not respond to the negative pulses produced by differentiating the multivibrator pulses.

The square waves which are delivered by the squaring device 6 are also applied, after differentiating, to the coincidence detector 18 in such manner that it responds only to the negative pulses coinciding in time with the trailing edges of the pulses produced by the squaring device 6.

The coincidence detector 18 is arranged to deliver a signal only when the trailing edges of the incoming pulses coincide in time with the trailing edges of the pulses from the multivibrator 16. This condition of operation can be attained by adjusting the length of the pulses generated by the multivibrator 16 by means of a control knob 20 provided for this purpose.

In order to provide a visual indication of the coincidence of the pulses, the signals from the coincidence detector 18 are utilized to trigger a second "one-shot" multivibrator, generally indicated at 22. The pulses generated by the latter multivibrator circuit, which are of much longer duration than the narrow pulses used to trigger this multivibrator, are applied to a neon lamp 24, which provides a visual indication whenever the multivibrator 22 is operating.

Thus, with the pointer of knob 20 adjusted to the zero-distortion position, the neon lamp will produce a continuously blinking light indicating that the incoming signals are not substantially distorted. If the neon lamp fails to provide a visual indication, the operator then merely adjusts the control knob 20 until the neon lamp again provides a visual indication and the calibrations 26, associated with the control knob 20, will then indicate the degree of space or mark distortion in the teletype signal.

Power for the teletype monitoring unit is provided by a conventional-type power supply, indicated in block form at 26, which is connected to alternating current supply lines 28. The voltage delivered by this power supply preferably is regulated accurately so that variations in line voltage will not affect the accuracy of the measurements.

The detailed operation of the monitoring unit will be more clearly understood from a consideration of the following description of the particular embodiment of the invention illustrated in the drawing.

The signals from the teletype lines 2 and 4 are applied across a voltage-divider circuit comprising two series connected fixed resistors 28 and 32. One end of resistor 28 is connected to a terminal 34 of a switch, generally indicated at 36, the other fixed contact 38 of which is connected to the junction of resistors 28 and 32. The movable arm 42 of this switch is connected through a series resistor 44 to the control grid 46 of a vacuum tube 48 of the squaring device 6. The switch 36 is provided so that the equipment can be utilized with either 30 or 60 milliampere teletype lines.

The anode 52 of the tube 48 is connected through a load resistor 54 to a positive-voltage supply lead 56 that is connected to an output terminal 58 on the power supply 26.

The anode 52 is coupled also through a fixed resistor 62 to a control grid 64 of a vacuum tube 66, a negative return circuit for the grid being provided through a fixed resistor 68 that is connected to a negative-voltage supply lead 72 from the negative output terminal 74 of the power supply 26. The cathodes 76 and 78 of tubes 48 and 66, respectively, are connected through a common bias and coupling resistor 82 to one end of the fixed resistor 32 and through a grid-biasing resistor 84 to the negative supply lead 72, a by-pass condenser 86 being connected in parallel with the resistor 84. A resistor 85 connects between positive voltage supply lead 56 and the junction of resistors 32 and 84.

The anode 88 of the tube 66 is connected through a plate load resistor 92 to the positive voltage supply lead 56. The output signal from the squaring device 6 is taken from anode 88 and applied by a lead 94 to the differentiating stage 14 and to the coincidence detector 18.

In this particular embodiment, the squaring circuit 6 comprises a conventional vacuum-tube trigger circuit whose function is to modify the shape of the incoming waves, as indicated at 8, to produce square pulses, as indicated at 12, the latter pulses having duration times equal to those of the respective incoming pulses. Other devices, for example relays, may be used to perform this squaring function. In those instances where the incoming pulses have a sufficiently square shape, the squaring device can be omitted. However, in commercial equipment where the rise time of the signal to be tested is unknown, it has been found desirable to include the squaring device.

The pulses from squaring device 6 are applied to a differentiating circuit comprising a condenser 96 and a resistor 98 connected in series between the anode lead 94 and the negative voltage supply lead 72. The junction of the condenser 96 and resistor 98 is connected to the control grid 102 of a vacuum tube 104, which is arranged to respond selectively to the positive pulses. The anode 106 of this tube is connected directly to the positive voltage supply lead and its cathode 108 is connected through a cathode load resistor 112 to the negative-voltage supply lead 72.

The differentiation of the square waves 12 produces a series of positive pulses of very short duration each corresponding to the leading edge of one of the square waves 12, and a series of similar pulses of negative polarity each corresponding to the trailing edge of one of the pulses 12. The tube 104, however, is operated at cut-off so that plate current does not ordinarily flow in this tube. The negative pulses, therefore, have no effect on the operation of tube 104, but the positive pulses are transmitted by the tube, and are coupled from the cathode 108 to the multivibrator circuit 16.

These positive short duration pulses are applied to the control grid 114 of the first multivibrator tube 116, this grid being biased positively by a connection to the junction of two fixed resistors 118 and 122, connected in series between the positive-voltage supply lead 56 and the negative lead 72. The anode 124 of this tube is connected through a load resistor 126 to a positive voltage supply lead 128 that is connected to a positive terminal 130 of the power supply 26.

The anode 124 of this tube is coupled also through a coupling condenser 132 to a control grid 134 of the second multivibrator tube 136, D.-C. return path for the grid 134 being provided through a fixed resistor 138, a variable resistor 142, and a fixed resistor 144, connected in series between the control grid and the negative lead 72. The cathodes 146 and 148 of tubes 116 and 136, respectively, are coupled to the negative lead 72 through a common bias and coupling resistor 152. The anode 154 of tube 136 is connected through a voltage-dropping resistor 156 to the positive voltage supply lead 128.

A positive bias voltage is applied to the control grid 134 of tube 136 by means of a fixed resistor 158 and a variable resistor 162 connected in series between the positive voltage supply lead 56 and the junction of variable resistor 142 and fixed resistor 144.

This multivibrator 16 is of the "one-shot" type so that each time it is triggered by an incoming positive pulse it will generate a single square wave and then return to its normal stable or "off" condition until again triggered by an incoming pulse. The duration of the pulse generated by the multivibrator 16 is determined primarily by the values of the capacitor 132, and the resistors 138, 142 and 162. Accordingly, the resistor 162 can be calibrated in accordance with the duration of the pulses generated by the multivibrator 16, and the control knob 20, therefore, is arranged to control the setting of the resistor 162. The indicating marks 26 associated with the pointer of knob 20 are calibrated to indicate the bias distortion from 50% mark to 50% space bias distortion. This represents a change in pulse length from 11 milliseconds to 33 milliseconds, where 22 milliseconds is the equivalent of zero bias distortion.

The multivibrator pulses appearing at anode 124 of tube 116 are coupled by a lead 164 to the coincidence detector 18 where they are differentiated by a series-connected condenser 166 and a fixed resistor 168. The junction of the condenser and resistor is connected to the control grid 172 of the coincidence detector tube 174.

Thus, the one-shot multivibrator and its differentiating circuit forms an effective manually controllable time delay circuit. This will be clear upon consideration of the fact that the multivibrator pulse is not utilized as such except for the purpose of generating a differentiated pulse similar to the pulse that triggers the multivibrator. Thus, an applied pulse triggers the multivibrator 16 which generates a single "square"

pulse having a length or time duration dependent upon the circuit constants. The differentiating circuit including the condenser 166 and resistor 168 differentiates this square pulse and produces a pulse coincident in time with the trailing edge of the square wave generated by the multivibrator. It is clear, therefore, that a time delay circuit is provided and that the extent of the time delay can be controlled by varying the duration of the pulses generated by the one-shot multivibrator.

The square waves from the squaring device 6 are applied also directly to the coincidence detector 18 where they are differentiated by a condenser 176 and a fixed resistor 178 connected between the cathode 182 of tube 174 and the negative supply lead 72.

The anode 184 of the coincidence tube 174 is coupled through a plate loading inductor 185 to the positive voltage supply lead 56. A fixed resistor 186 is connected between the positive voltage supply lead 56 and the cathode 182, and with the cathode resistor 178 forms a voltage-divider circuit that biases the coincidence tube 174 beyond cut-off.

This bias voltage is such that a positive pulse applied to the grid 172, or a negative pulse applied to the cathode 182 (both of the magnitudes delivered by the respective circuits), will not cause current to flow through the tube 174. However, if at the instant a positive pulse is applied to grid 172, a negative pulse is applied simultaneously to the cathode 182, the combined effects of the pulses will be sufficient to cause plate current to flow in this tube. That is, if the trailing edge of a square wave delivered by the squaring device 6 coincides in time with the trailing edge of a pulse generated by the multivibrator circuit 16, a pulse of plate current will flow through the tube 174. Tube 174, therefore, delivers a series of pulses whenever the pulse lengths of the incoming signals correspond to the pulse lengths of the signals generated by the multivibrator 16.

These pulses of current through the tube 174 are of such short duration that they will not produce a satisfactory indication from the neon lamp 24, and, accordingly, are utilized to trigger another "one-shot" multivibrator or pulse-lengthening circuit 22.

The pulses appearing at the anode 184 of the coincidence tube 174 are coupled through a condenser 188 to the control grid 192 of a multivibrator tube 194, a grid return circuit being provided by a resistor 196 connected between the control grid 192 and supply lead 72. This multivibrator circuit also includes a second tube 196 in a circuit similar to that described in connection with multivibrator 16. The cathodes 198 and 202 of these tubes are connected through a common resistor 204 to the negative supply lead 72, and the anodes 206 and 208 are connected through plate resistors 212 and 214, respectively, to the positive voltage supply lead 56. The anode 206 is coupled through a condenser 216 to the control grid 218 of the tube 196 which is connected also through a resistor 222 to the positive voltage supply lead 56.

The neon lamp indicator 24 is connected between the anode 208 of tube 96 and a negative supply lead 72. The tube 196 draws current when the multivibrator is in its "off" condition, so that the voltage applied to the neon lamp 24 is insufficient to ignite it. However, when an incoming pulse is supplied to the multivibrator circuit 22, the plate current in tube 196 is cut off for the duration of the pulse generated by this multivibrator and the neon lamp 24 accordingly is ignited.

From the foregoing it will be apparent that the embodiment of the invention described herein is well suited to attain the ends and objects hereinbefore set forth, and that it can be economically manufactured since the separate components are readily available from commercial sources. Moreover, it is apparent that a variety of modifications or substitutions as may be desirable in adapting the invention for particular applications may be made without departing from the spirit of the invention or the scope of the claims hereinafter set forth. It is to be understood, also, that certain features of the invention may be at times utilized to advantage without a corresponding use of other features.

I claim:

1. A teletype distortion monitoring system comprising a pair of transmission lines carrying teletype signals whose distortion is to be measured, a trigger-circuit coupled to said transmission lines and responsive to said signals for generating square waves having time durations equal to corresponding teletype signals and substantially coincident in time therewith, a first resistance-capacitance differentiating circuit connected to the output of said trigger circuit, a pulse-selection circuit coupled to said first differentiating circuit and responsive selectively to positive pulses delivered thereby, a first one-shot multivibrator circuit under the control of said pulse-selection circuit and including a variable resistor for controlling the duration of pulses produced by said multivibrator circuit, a second resistance-capacitance differentiating network coupled to the output of said multivibrator, a third resistance-capacitance differentiating network coupled to the output of said trigger circuit, a coincidence detector including a vacuum tube having a control grid coupled to said second differentiating network and a cathode coupled to said third differentiating network, and a source of positive bias voltage connected to said cathode and of sufficient magnitude to bias said tube beyond cut-off, said tube being arranged to draw plate current only when a positive pulse is received by said control grid simultaneously with the reception of a negative pulse at said cathode, a second one-shot multi-vibrator connected to said coincidence tube and arranged to be triggered by the flow of plate current therein, and a neon-lamp indicator coupled to the output of said multi-vibrator and arranged to indicate when said variable resistor has been manually adjusted in accordance with the distortion of said teletype signals.

2. A teletype distortion monitoring system comprising a pair of transmission lines carrying teletype pulse signals whose distortion is to be measured, a wave-squaring circuit coupled to said transmission lines for squaring up the leading and trailing edges of said signals, a first differentiating circuit connected to the output of said trigger circuit, a pulse selection circuit coupled to said first differentiating circuit and responsive selectively to positive pulses delivered thereby, a first square-wave generator under the control of said pulse selection circuit and including a variable resistor for controlling the duration of pulses produced by said generator, a second differentiating network coupled to the output of said first generator, a third differentiating network coupled to the output of said wave-squaring circuit, a coincidence detector including a vacuum tube having a control grid coupled to said second differentiating network and a cathode coupled to said third differentiating network, and a source of bias voltage connected to said vacuum tube and of sufficient magnitude to bias said tube beyond cut-off, said tube being arranged to draw plate current only when a positive pulse is received by said control grid simultaneously with the reception of a negative pulse at said cathode, a second square-wave generator connected to said coincidence tube and arranged to be triggered by the flow of plate current therein, and a visual indicator coupled to the output of said second generator and arranged to indicate when said variable resistor has been manually adjusted in accordance with the distortion of said teletype signals.

3. A teletype distortion monitoring system comprising a pair of transmission lines carrying teletype signals whose distortion is to be measured, a first differentiating circuit coupled to said transmission lines for generating signals coincident in time with the leading and trailing edges of the teletype pulses, a pulse selection circuit coupled to said first differentiating circuit and responsive selectively to positive pulses delivered thereby, a first multivibrator circuit including a variable element for controlling the duration of pulses produced by said multivibrator circuit, means under the control of said pulse selection circuit for synchronizing the operation of said multivibrator with said teletype signals, a second differentiating network coupled to the output of said first multivibrator, a third differentiating network coupled to said transmission lines, a coincidence detector including a vacuum tube having a first control element coupled to said second differentiating network and a second control element coupled to said third differentiating network, and a source of bias voltage connected to a control element of said tube and arranged to bias said tube beyond cut-off, said tube being arranged to draw plate current only when two pulses of predetermined polarity are received simultaneously by it, and indicating means under the control of said coincidence tube.

4. A teletype distortion monitoring system comprising a teletype receiving station, a pair of transmission lines connected to said station and carrying teletype signals whose distortion is to be measured, a first differentiating circuit coupled to said transmission line for generating signals coincident in time with the leading and trailing edges of the teletype pulses, a pulse selection circuit coupled to said first differentiating circuit and responsive selectively to said signals coincident in time with the leading edges of said teletype pulses, a signal generator circuit coupled to and under the control of said pulse selection circuit for producing control pulses of short duration relative to the duration of said teletype pulses, means forming part of said signal generator for establishing a manually adjustable synchronization relationship between said control pulses and the leading edges of said teletype pulses, a second differentiating network coupled to said transmission lines, a coincidence detector coupled to said second differentiating network and to said signal generator circuit, said detector being arranged to draw plate current only when two pulses of predetermined polarity are received simultaneously by it, and indicating means under the control of said coincidence tube.

5. A teletype distortion monitoring system comprising a pair of transmission lines carrying teletype signals whose distortion is to be measured, differentiating means coupled to said transmission line for generating first control signals coincident in time with the leading edges of the teletype pulses and second control signals coincident in time with the trailing edges of said pulses, a first time-delay signal-generating circuit responsive to said first control signals and arranged to produce third control signals delayed in time with respect to said first control signals, said signal-generating circuit including a manually adjustable element for controlling the delay time between corresponding pulses of said first and third control signals, a coincidence detector, circuit means coupling said second and third signals to said coincidence detector, and indicating means under the control of said coincidence detector.

6. A pulse duration measuring system comprising first circuit means responsive to the leading edges of incoming pulses whose distortion is to be measured, second circuit means responsive to the trailing edges of pulses to be measured, a coincidence detector responsive selectively to two simultaneous pulses of predetermined polarity, pulse generating means under the control of said first circuit means for producing control pulses having a substantially shorter duration than said incoming pulses, said pulse generating means including time delay means whereby said control pulses occur a predetermined interval after the leading edge of each incoming pulse, manually adjustable means for controlling said time delay means to vary the time interval between the leading edge of each incoming pulse and the next subsequent control pulse, means coupling said second circuit means and said control pulses to said coincidence detector, and indicating means for denoting the operation of said coincidence detector.

7. In a teletype system, apparatus for measuring the distortion of incoming teletype signals comprising differentiating means coupled to said teletype system and responsive to teletype signals for producing pulses coincident in time with the leading and trailing edges of the teletype pulses whose distortion is to be measured, circuit means responsive selectively to the leading-edge pulses produced by said differentiating means, a coincidence detector responsive selectively to two simultaneous pulses of predetermined polarity, pulse generating means under the control of said circuit means for producing control pulses having a substantially shorter duration than said incoming pulses, said pulse generating means including manually adjustable time delay means whereby each of said control pulses occurs an interval of time after the leading edge of each incoming pulse, connecting means coupling said trailing-edge pulses produced by said differentiating means and said control pulses to said coincidence detector, and indicating means for denoting the operation of said coincidence detector.

LAWRENCE M. CARVER.

REFERENCES CITED

The following references are of record in the file of this patent:

UNITED STATES PATENTS

| Number | Name | Date |
|---|---|---|
| 1,969,573 | Montgomery et al. | Aug. 7, 1934 |
| 2,107,149 | Hearn | Feb. 1, 1938 |
| 2,481,354 | Schuler | Sept. 6, 1949 |